Figure 1:
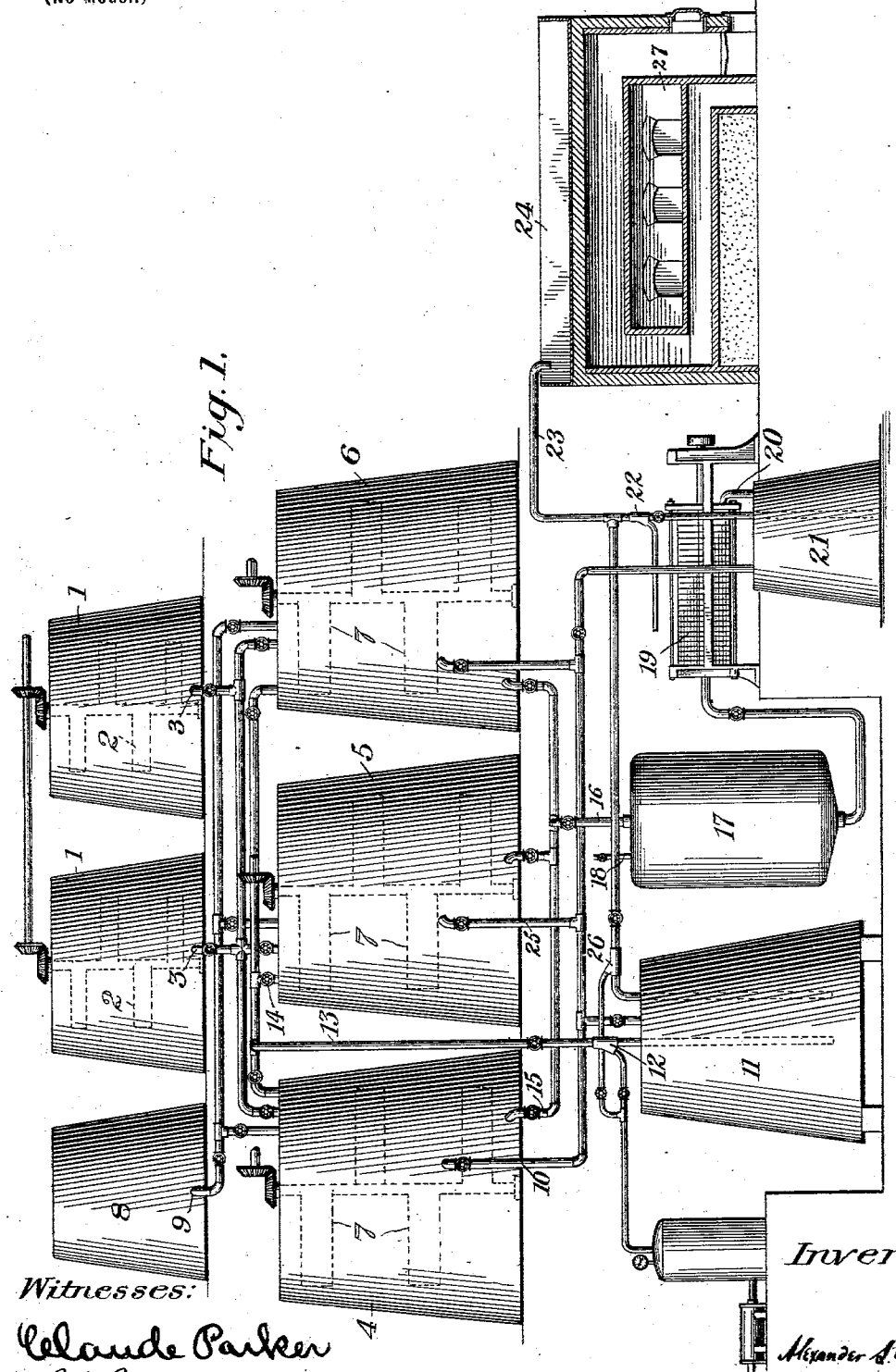

No. 715,214. Patented Dec. 2, 1902.
A. S. RAMAGE.
PROCESS OF CONVERTING LEAD SULFATE INTO LEAD CARBONATE.
(Application filed Mar. 24, 1902.)
(No Model.) 2 Sheets—Sheet 1.

Witnesses:
Claude Parker
R A Bildurson

Inventor.
Alexander S. Ramage
By Eugene A. Byrnes
His Attorney.

No. 715,214. Patented Dec. 2, 1902.
A. S. RAMAGE.
PROCESS OF CONVERTING LEAD SULFATE INTO LEAD CARBONATE.
(Application filed Mar. 24, 1902.)
(No Model.) 2 Sheets—Sheet 2.
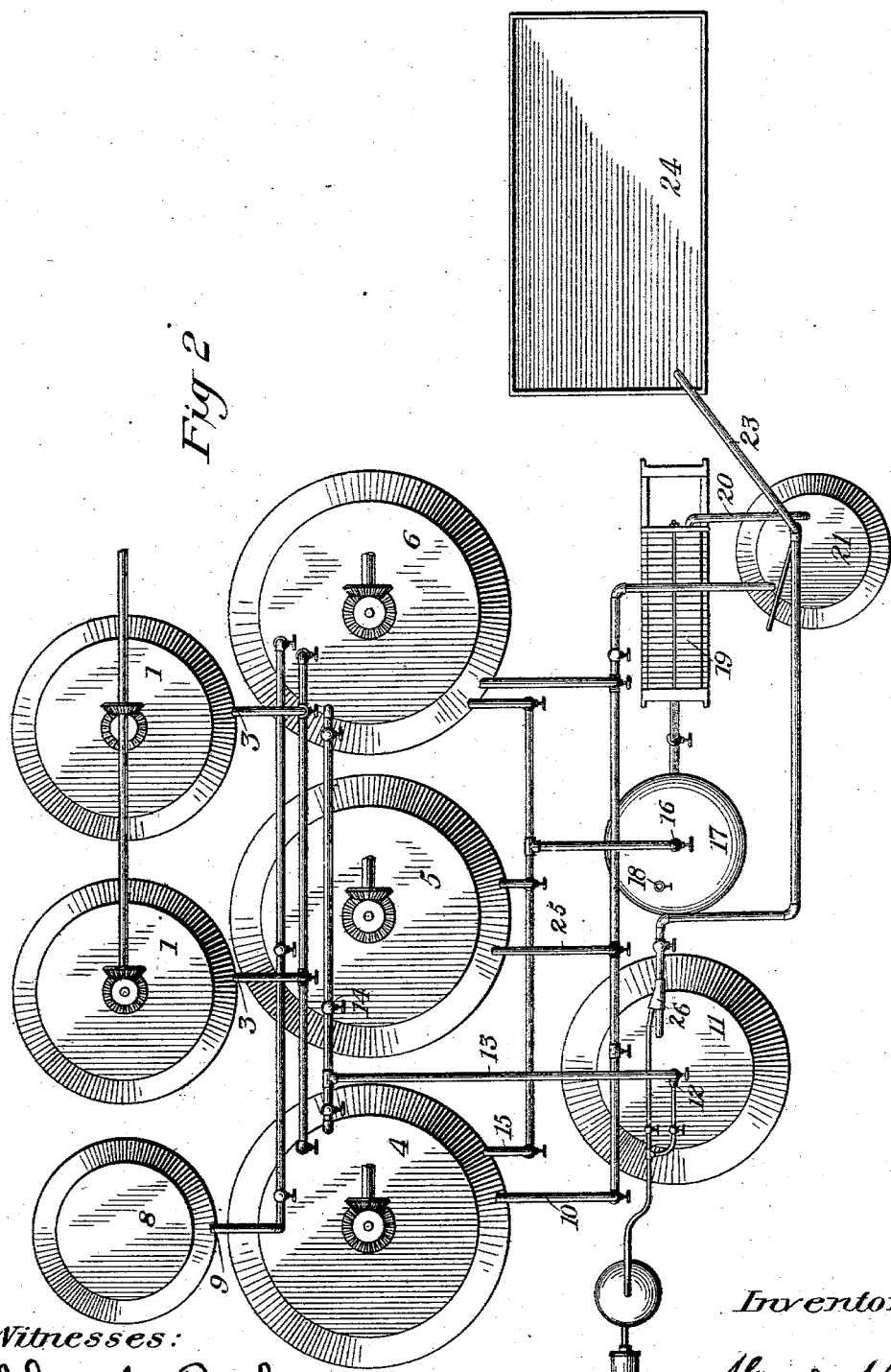

UNITED STATES PATENT OFFICE.

ALEXANDER SYDNEY RAMAGE, OF CLEVELAND, OHIO.

PROCESS OF CONVERTING LEAD SULFATE INTO LEAD CARBONATE.

SPECIFICATION forming part of Letters Patent No. 715,214, dated December 2, 1902.

Application filed March 24, 1902. Serial No. 99,747. (No specimens.)

*To all whom it may concern:*

Be it known that I, ALEXANDER SYDNEY RAMAGE, a citizen of the United States, residing at Cleveland, in the State of Ohio, have invented certain new and useful Improvements in Processes of Converting Lead Sulfate into Lead Carbonate, of which the following is a specification.

According to this invention the waste sulfate of lead paste taken from sulfuric-acid chambers is converted into lead carbonate by the action of sodium carbonate in excess, the resulting sodium-sulfate solution being evaporated and calcined.

A suitable apparatus for carrying out the process is shown in the accompanying drawings, in which—

Figure 1 is a front elevation showing the evaporating and calcining furnace in section, and Fig. 2 is a plan view.

The sulfate of lead paste is placed in tanks 1, having vertical rotary agitators 2, and is thoroughly mixed therein with water. The mixture is then passed through fine brass sieves and run out of the tanks through valved outlets 3 into tanks 4 5 6, the charge for each of these tanks being preferably equivalent to three thousand and thirty pounds of dry sulfate. The sulfate is then allowed to settle to the bottom of each tank and the water run off. Fresh water is then added, and the sulfate is thoroughly stirred up therewith by vertical rotary stirrers 7. This wash-water is run off and the sulfate again washed until every trace of free acid is removed. The sulfate is then allowed to settle to the bottom of the tanks again and the final wash-water run off. A certain amount of sodium carbonate, preferably in the form of soda ash and amounting to fifteen hundred pounds, is then dissolved in tank 8 in as little water as possible. The solution is then run out through valved outlet-pipe 9 and introduced into tank 4. The agitator of this tank is set in motion to effect a thorough mixture of the lead sulfate and sodium carbonate, the temperature of the mixture being raised to about 60° centigrade, as by the injection of live steam. After the reaction has been allowed to progress for about twelve hours the resulting lead carbonate is allowed to settle, and the clear liquor, consisting of sodium sulfate containing some sodium carbonate, is run off through valved outlet 10 and delivered into tank 11, whence it is again lifted by ejector 12 and delivered through pipe 13 and valved inlet 14 into tank 5. The lead carbonate remaining in tank 4 is then thoroughly washed by decantation with water and run through valved outlet 15 and valved inlet 16 into steel tank 17. From this tank the lead carbonate is blown by compressed air entering through inlet 18 into filter-press 19. The filtrate from this press is delivered through pipe 20 into tank 21 and again lifted from this tank and delivered by ejector 22, through pipe 23, into pan 24, where it is evaporated to Glauber's salts, and may be calcined, if desired, to anhydrous sodium sulfate. The lead carbonate removed from the filter-press is dried and calcined in muffle 27 at a temperature below a red heat, with access of air for an hour, the product being a very fine marketable litharge. The lead sulfate previously introduced into tank 5 is thoroughly stirred up with the solution delivered from tank 4, and the sodium carbonate remaining in solution is thereby entirely converted into sodium sulfate. The pure sodium-sulfate solution is then run off through valved outlet 25 into tank 11, whence it is again lifted by ejector 26 and delivered into evaporating-pan 24. A fresh portion of sodium-carbonate solution is then prepared in tank 8 and delivered into tank 5, where it is thoroughly stirred up with the mixture of lead sulfate and carbonate therein, the remaining lead sulfate being thereby converted into carbonate. The resulting clear solution is then run into tank 11, whence it is lifted into tank 6, the same operations being then repeated, the tanks 4 5 6 being thus used in rotation.

The treatment of lead sulfate with a chemically equivalent amount of sodium carbonate will only effect the conversion of a portion of the lead sulfate into lead carbonate. I have discovered, however, that this result may be effected by the use of an excess of sodium carbonate, and, further, that the residual sodium carbonate in the solution may be entirely converted into sodium sulfate by the action of an excess of lead sulfate. The process therefore utilizes the well-known laws of mass reaction, the complete reaction being effected in two steps, which are balanced in opposite directions, first by an excess of one and then of the other reagent—in other words, first by the use of an excess of sodium carbonate on lead sulfate and then by the use of an excess of lead sulfate on sodium carbonate.

I claim—

1. The process of converting lead sulfate into lead carbonate, which consists in subjecting a charge of lead sulfate to the action of a solution of an alkali carbonate, said carbonate being in amount sufficient to convert all of the lead in the charge into carbonate and in excess of that theoretically requisite, separating the resulting solution, containing alkali sulfate and carbonate, from the lead carbonate, and subjecting it to the action of an excess of lead sulfate, to convert the remaining alkali carbonate into sulfate, as set forth.

2. The process of converting lead sulfate into lead carbonate, which consists in subjecting a charge of lead sulfate to the action of a solution of an alkali carbonate, said carbonate being in amount sufficient to convert all of the lead in the charge into carbonate and in excess of that theoretically requisite, applying heat during the operation, separating the resulting solution, containing alkali sulfate and carbonate, from the lead carbonate, and subjecting it to the action of an excess of lead sulfate, to convert the remaining alkali carbonate into sulfate, as set forth.

3. The process of converting lead sulfate into lead carbonate, which consists in subjecting a charge of lead sulfate to the action of a solution of an alkali carbonate, said carbonate being in amount sufficient to convert all of the lead in the charge into carbonate and in excess of that theoretically requisite, heating the mixture to about 60° centigrade during the operation, separating the resulting solution, containing alkali sulfate and carbonate, from the lead carbonate, and subjecting it to the action of an excess of lead sulfate, to convert the remaining alkali carbonate into sulfate, as set forth.

4. The process of treating waste sulfate of lead from sulfuric-acid chambers, which consists in thoroughly washing the sulfate to remove free acid, subjecting a charge of the sulfate to the action of a solution of an alkali carbonate, said carbonate being in amount sufficient to convert all of the lead in the charge into carbonate and in excess of that theoretically requisite, applying heat during the operation, separating the resulting solution, containing alkali sulfate and carbonate, from the lead carbonate, and subjecting it to the action of an excess of lead sulfate, to convert the remaining alkali carbonate into sulfate, as set forth.

5. The process of treating waste sulfate of lead from sulfuric-acid chambers, which consists in thoroughly washing the sulfate to remove free acid, subjecting a charge of the sulfate to the action of a solution of an alkali carbonate in amount sufficient to convert all of the lead in the charge into carbonate and in excess of that theoretically requisite, applying heat during the operation, separating the resulting solution, containing alkali sulfate and carbonate, from the lead carbonate, and subjecting it to the action of an excess of lead sulfate, to convert the remaining alkali carbonate into sulfate, and calcining the lead carbonate at a temperature below a red heat, with admission of air, until converted into litharge, as set forth.

6. The process of converting lead sulfate into lead carbonate, which consists in subjecting a charge of lead sulfate to the action of a solution containing an alkali sulfate and carbonate, thereby converting a portion of the lead sulfate into carbonate and the whole of the alkali carbonate into sulfate, separating the resulting mixture of lead carbonate and sulfate from the solution and subjecting it to the action of a solution of an alkali carbonate in amount sufficient to convert the lead sulfate into carbonate, as set forth.

7. The process of converting lead sulfate into lead carbonate, which consists in subjecting one portion of lead sulfate to the action of a solution of an alkali carbonate, said carbonate being in excess of the amount theoretically requisite to convert the lead sulfate into carbonate, separating the remaining solution, containing alkali sulfate and carbonate, from the lead carbonate and bringing it into contact with another portion of lead sulfate, thereby converting the remaining alkali carbonate into sulfate, separating the resulting mixture of lead carbonate and sulfate from the solution and subjecting it to the action of a solution of an alkali carbonate in amount sufficient to convert the lead sulfate into carbonate, as set forth.

8. The process of converting lead sulfate into lead carbonate, which consists in subjecting one portion of lead sulfate to the action of a solution of an alkali carbonate, said carbonate being in excess of the amount theoretically requisite to convert the lead sulfate into carbonate, separating the remaining solution, containing alkali sulfate and carbonate, from the lead carbonate and bringing it into contact with another portion of lead sulfate, thereby converting the remaining alkali carbonate into sulfate, separating the resulting mixture of lead carbonate and sulfate from the solution and subjecting it to the action of a solution of an alkali carbonate in amount sufficient to convert the lead sulfate into carbonate, and repeating the same cycle of operations on successive portions of lead sulfate, as set forth.

In testimony whereof I affix my signature in presence of two witnesses.

ALEXANDER SYDNEY RAMAGE.

Witnesses:
  G. H. REDFIELD,
  A. T. HATCH.